United States Patent [19]

Handa et al.

[11] Patent Number: 4,799,708
[45] Date of Patent: Jan. 24, 1989

[54] OFF-ROAD VEHICLE

[75] Inventors: Akio Handa; Keiji Kasa; Eiji Hosoya; Takerou Shibukawa, all of Saitama, Japan

[73] Assignee: Honda Giken Kogyo Kabushiki Kaisha, Tokyo, Japan

[21] Appl. No.: 113,861

[22] Filed: Oct. 27, 1987

[30] Foreign Application Priority Data

Oct. 27, 1986 [JP] Japan ................. 61-255055
Oct. 27, 1986 [JP] Japan ................. 61-255056
Oct. 27, 1986 [JP] Japan ................. 61-255058

[51] Int. Cl.$^4$ ............................. B62D 21/00
[52] U.S. Cl. ................... 280/796; 280/691; 296/205
[58] Field of Search ............ 296/205; 280/661, 771, 280/691, 693, 675, 781, 796, 798

[56] References Cited

U.S. PATENT DOCUMENTS 2,065,071 12/1936 Harris ........................... 280/661
3,257,121 6/1966 Muller ........................... 280/611
4,641,854 2/1987 Masuda et al. .
4,708,361 11/1987 Takada et al. ................... 280/691

FOREIGN PATENT DOCUMENTS

418427 2/1947 Italy ............................ 296/205
32-56890 12/1957 Japan .
51-104525 8/1976 Japan .
51-109519 9/1976 Japan .
53-17532 5/1978 Japan .
54-19606 7/1979 Japan .
60-134042 9/1985 Japan .
61-56185 4/1986 Japan .

Primary Examiner—Kenneth R. Rice
Attorney, Agent, or Firm—Irving M. Weiner; Joseph P. Carrier; Pamela S. Burt

[57] ABSTRACT

An off-road vehicle comprises a vehicle frame, a pair of front wheels rotatably supported on a front portion of the vehicle frame, a pair of rear wheels rotatably supported on a rear portion of the vehicle frame, and a framework on each of lateral sides of the vehicle frame and including upper and lower pipes inclined upwardly in a forward direction and substantially parallel to each other. Each of the front wheels is rotatably mounted on the framework by means of a front wheel suspension mechanism comprising knuckle arm supporting the front wheel, a V-shaped upper arm having a base pivotally mounted on an upper portion of the knuckle arm and front and rear ends pivotally attached to the upper pipe at front and rear positions thereon, and a V-shaped lower arm having a base pivotally mounted on a lower portion of the knuckle arm and front and rear ends pivotally attached to the lower pipe at front and rear positons thereon. When the off-road vehicle thus constructed is viewed in side elevation, the distances from a vertical line passing through the center of the axle of the front wheel to the. pivoted front ends of the V-shaped upper and lower arms are smaller than the distances from the vertical line to the pivoted rear ends of the V-shaped upper and lower arms.

4 Claims, 7 Drawing Sheets

OFF-ROAD VEHICLE

BACKGROUND OF THE INVENTION

1. Field of the Invention

The present invention relates to an off-road vehicle, and more particularly to a front-wheel suspension for an off-road vehicle.

2. Description of the Relevant Art

Figure 5:
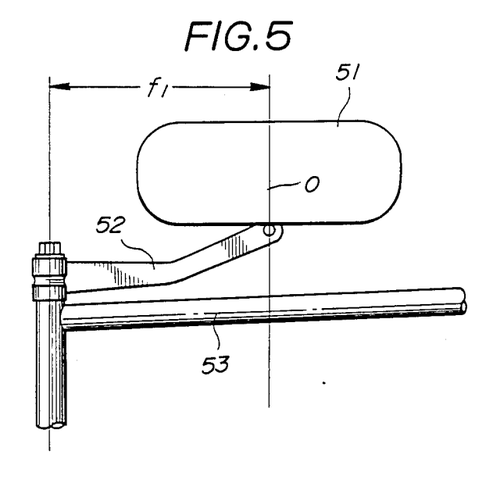
FIG. 5 is a plan view of a front wheel supported on a suspension in a conventional off-road vehicle.

There are known three- and four-wheeled off-road vehicles known as buggies. Japanese Utility Model Publication No. 57-56890, for example, discloses an off-road vehicle having an engine mounted on a rear portion of a horizontal vehicle frame of pipes, a driver's seat disposed in front of the engine, and two front wheels rotatably mounted on a front portion of the vehicle frame by respective trailing-arm suspensions. When the driver is seated on the driver's seat the driver's legs are positionable in a front space of the vehicle frame FIG. 5 of the accompanying drawings fragmentarily shows a front portion of the vehicle frame of the disclosed off-road vehicle. A front wheel 51 is supported on the front portion of the vehicle frame 53 by a trailing arm 52.

Figure 6:
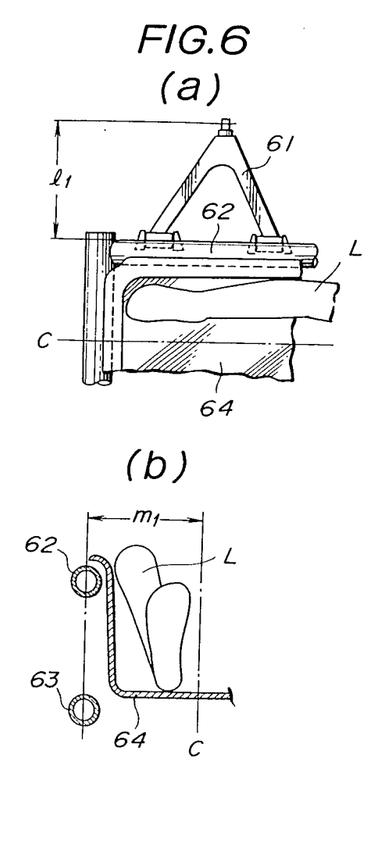
FIGS. 6(a) and 6(b) are fragmentary plan and cross-sectional views of a leg accommodating space in a front frame portion of another conventional off-road vehicle.

Japanese Laid-Open Utility Model Publication No. 61-56185 shows a frame structure including a front portion having, on each lateral side, upper and lower parallel pipes extending longitudinally of the frame structure and inclined upwardly in the forward direction, with each front wheel being rotatably supported by a double-wishbone suspension comprising V-shaped upper and lower control arms pivotally mounted respectively on the upper and lower pipes. FIG. 6(a) illustrates such a V-shaped upper control arm 61 pivotally mounted on an upper pipe 62 of the frame structure. A V-shaped lower control arm (not shown) is disposed substantially below the V-shaped upper control arm 61.

With the trailing arm 52 (FIG. 5) being used to support the front wheel 51 on the frame 53, the distance f1 of the front end of the frame 53 to the center O of the axle of the front wheel 51, i.e., the amount of projection of the frame 53 forwardly of the axle of the front wheel 51, is large, and the weight of the frame is also increased. Since the frame 53 is disposed horizontally, the front end of the frame 53 may hit the ground while the vehicle is running over rough terrain.

According to the double-wishbone front wheel suspension shown in in FIG. 6(a), however, the amount of forward projection of the frame is reduced and so is the frame weight because the upper and lower pipes of the front end of the frame are included upwardly in the forward direction. The upwardly inclined upper and lower pipes are less liable to interfere with the ground while running over bumpy surfaces. The front and rear ends of the V-shaped upper and lower control arms are pivotally supported on the upper and lower pipes of the frame by front and rear pivot shafts. When the vehicle is viewed in side elevation, the distances from the vertical line passing through the center of the axle of each front wheel to the pivoted front ends of the upper and lower control arms are larger than or equal to the distances from the same vertical line to the pivoted rear ends of the upper and lower control arms. This suspension arrangement suffers the following problems:

Since the distances from the vertical line passing through the center of the axle of each front wheel to the pivoted front ends of the upper and lower control arms are comparatively large, much remains to be improved in avoiding undesirable physical contact between the upper and lower control arms and bumps on ground surfaces. Inasmuch as the distances from the vertical line to the pivoted rear ends of the upper and lower control arms are comparatively small, much remains to be improved in attaining rigidity against bending forces applied rearwardly to the upper and lower control arms.

Figure 7:
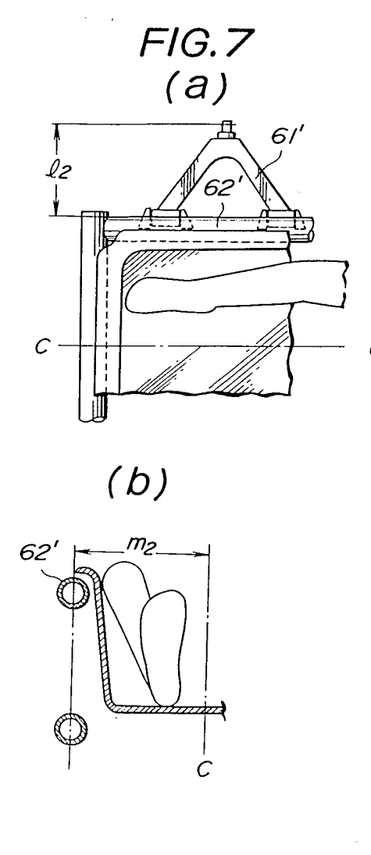
FIGS. 7(a) and 7(b) are fragmentary plan and cross-sectional views of a leg accommodating space in a front frame portion of a modification of the conventional off-road vehicle shown in FIG. 6(a) and 6(b)

In the suspension type shown in FIG. 6(a), a tie rod for turning the front wheel is required to extend between the parallel upper and lower pipes and project outwardly into coupled engagement with a knuckle arm. If brackets were mounted on the outer side surfaces of the upper and lower pipes and the front and rear ends of the upper and lower control arms were attached to the brackets by the pivot shafts, the tie rods would significantly interfere with the upper and lower pipes when the front wheels would be moved in large vertical strokes. As shown in FIGS. 6(a) and 6(b), a box-shaped floor panel 64 is disposed vertically from above the lower pipe 63 toward the upper pipe 62 for accommodating and protecting the legs L of the driver seated on the driver's seat. If the transverse length $l_1$ of the upper control arm 61 (and the lower control arm) is increased in order to increase the vertical stroke of the front wheels with the limited tread thereof, the upper pipe 62 must be disposed closely to the central line C of the vehicle frame. This however is disadvantageous in that the leg space for the driver is reduced as indicated by $m_1$. If the leg space is increased as indicated by $m_2$ as shown in FIG. 7(b) by spacing an upper pipe 62' widely from the vehicle frame central line C, the transverse length of an upper control arm 61' (and a lower control arm) is reduced as indicated by $l_2$ since the tread of the front wheels is limited, resulting in a reduced vertical stroke of the front wheels.

SUMMARY OF THE INVENTION

In view of the aforesaid problems of the conventional front wheel supensions for off-road vehicles, it is an object of the present invention to provide an off-road vehicle having double-wishbone front suspensions wherein the amount of forward projection of the front end of a vehicle frame is reduced to lower the weight of the vehicle frame and the danger of contact of the front end of the vehicle frame with the ground, each of the front suspensions comprises V-shaped upper and lower arms arranged to avoid physical interference with foreign objects and bumpy, off-road surfaces, and the V-shaped upper and lower arms have increased rigidity against bending forces applied rearwardly thereto.

Another object of the present invention is to provide an off-road vehicle having double-wishbone front suspensions wherein the vertical stroke of front wheels is increased while avoiding physical intereference between tie rods and upper and lower pipes of a vehicle frame.

Still another object of the present invention is to provide an off-road vehicle having double-wishbone front suspensions wherein the vertical stroke of front wheels is increased with a limited front wheel tread, and a wide space is available in the front portion of a vehicle frame for accommodating the driver's legs.

According to the present invention, an off-road vehicle according to the present invention comprises a vehicle frame, a pair of front wheels rotatably supported on a front portion of the vehicle frame, a pair of rear wheels rotatably supported on a rear portion of the vehicle frame, and a framework on each of lateral sides of the vehicle frame and including upper and lower pipes inclined upwardly in a forward direction and substantially parallel to each other. Each of the front wheels is rotatably mounted on the corresponding framework by means of a front wheel suspension mechanism comprising a knuckle arm supporting the front wheel, a V-shaped upper arm having a base pivotally mounted on an upper portion of the knuckle arm and front and rear ends pivotally attached to the upper pipe at front and rear positions thereon, and a V-shaped lower arm having a base pivotally mounted on a lower portion of the knuckle arm and front and rear ends pivotally attached to the lower pipe at front and rear positions thereon. When the off-road vehicle thus constructed is viewed in side elevation, the distances from a vertical line passing through the center of the axle of the front wheel to the pivoted front ends of the V-shaped upper and lower arms are smaller than the distances from the vertical line to the pivoted rear ends of the V-shaped upper and lower arms.

The lower pipe of each framework comprises a front inclined rod inclined upwardly in a forward direction and a rising rod contiguous to the front inclined rod, the rising rod progressively diverging outwardly in a rearward direction and inclined upwardly in the rearward direction. The upper pipe progressively diverges outwardly in the rearward direction and has a rear end joined to the rising rod.

The front and rear pivoted ends of the V-shaped upper arm are coupled by respective pivot shafts to front and rear channel-shaped brackets, respectively, depending from a lower surface of the upper pipe. The front and rear pivoted ends of the V-shaped lower arm are coupled by respective pivot shafts to front and rear channel-shaped brackets, respectively, erected from an upper surface of the front inclined rod of the lower pipe. A tie rod for turning each of the front wheels extend from inside of the vehicle between the upper pipe and the front inclined rod and is coupled to the knuckle arm.

The above and further objects, details and advantages of the present invention will become apparent from the following detailed description of preferred embodiments thereof, when read in conjunction with the accompanying drawings.

DETAILED DESCRIPTION OF THE PREFERRED EMBODIMENTS

Figure 1:
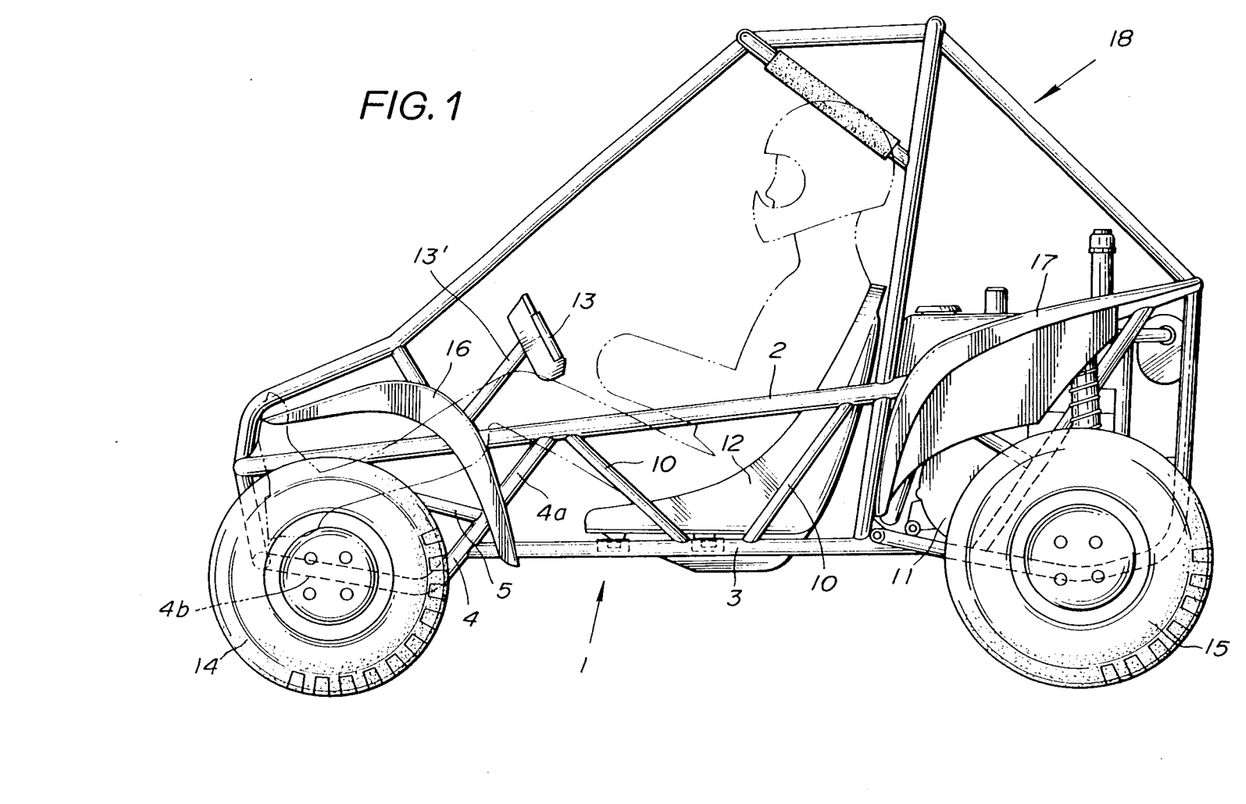
FIG. 1 is a side elevational view of an off-road vehicle according to an embodiment of the present invention.

As shown in FIG. 1, an off-road vehicle according to an embodiment of the present invention includes a vehicle frame 1 of pipes mainly including a pair of laterally spaced main pipes 2 extending substantially longitudinally of the vehicle, a pair of laterally spaced seat side pipes 3 extending substantially longitudinally of the vehicle substantially parallel to each other below the respective main pipes 2, and a plurality of stiffening pipes 10 interconnecting the main pipes 2 and the seat side pipes 3.

An engine 11 and its accessories are mounted on a rear portion of the pipe frame 1, and a driver's seat 12 is disposed on the frame 1 in front of the engine 11. A steering shaft 13' coupled at its upper end to a steering handle 13 is substantially vertically disposed forwardly of the driver's seat 12. Two front wheels 14 and two rear wheels 15 are rotatably supported respectively on front and rear portions of the frame 1 at its opposite lateral sides. The front and rear wheels 14, 15 are partly covered with front and rear fenders 16, 17, respectively. An upper roll bar assembly 18 is integrally mounted on the vehicle frame 1. When the driver is seated on the driver's seat 12, as indicated by the imaginary lines, the legs of the driver are extended in a front space in the frame 1 for controlling the vehicle.

Figure 2:
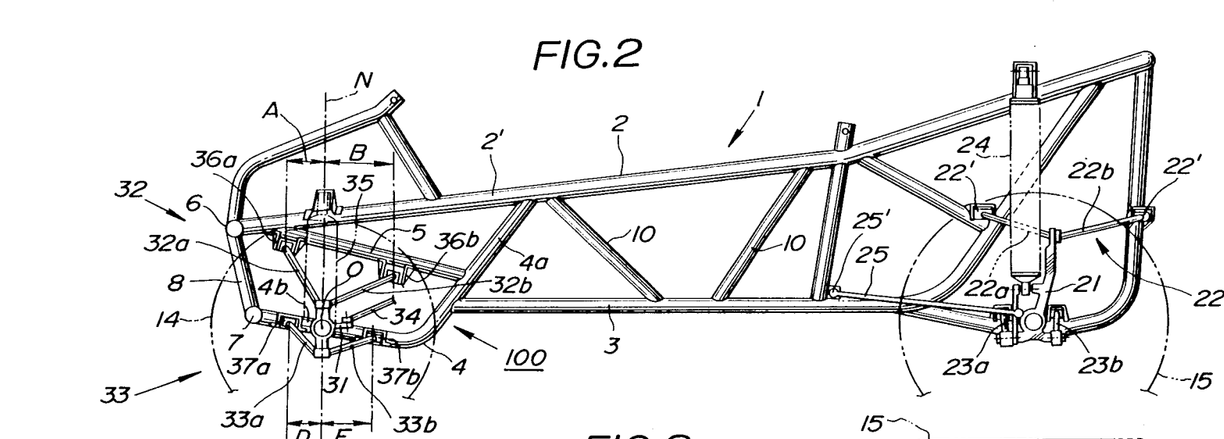
FIG. 2 is a side elevational view of a vehicle frame and suspensions of the off-road vehicle shown in FIG. 1.
Figure 3:
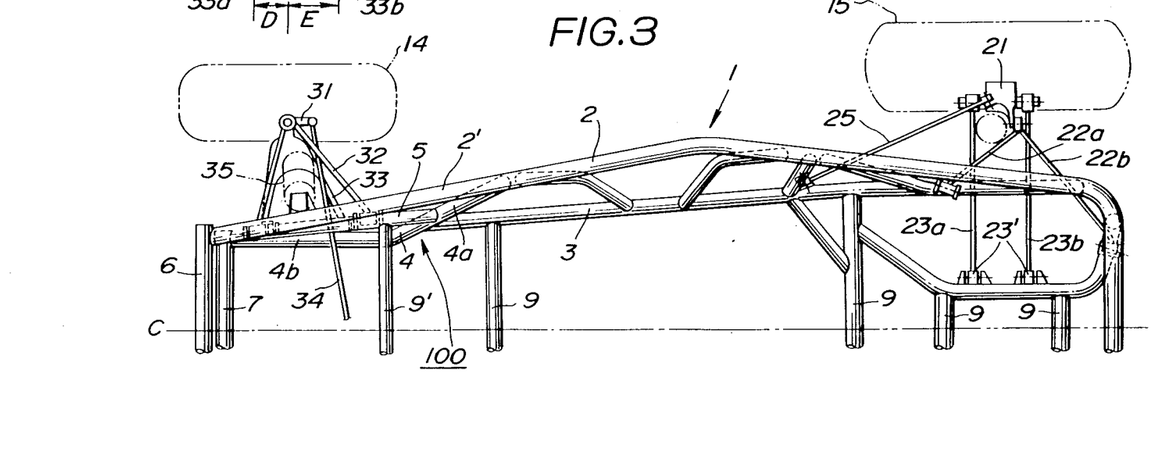
FIG. 3 is a fragmentary plan view of the vehicle frame and suspensions of the off-road vehicle shown in FIG. 1.

As shown in FIGS. 2 and 3, each of the front wheels 14 and each of the rear wheels 15 are supported on the front and rear portions of the vehicle frame 1 by wishbone type suspensions.

The rear wheel suspension on each side of the rear portion of the vehicle frame 1 comprises a knuckle arm 21 by which the rear wheel 15 is rotatably supported, an upper arm 22 swingably supported on the rear portion of the frame 1 by two first pivot members 22' and projecting laterally outwardly, the upper arm 22 being pivotally coupled to an upper portion of the knuckle arm 21, and two I-shaped lower arms 23a, 23b swingably supported on the rear portion of the frame 1 by two second pivot members 23' below the first first pivot members 22' and projecting laterally outwardly, the lower arms 23a, 23b being pivotally coupled to a lower portion of the knuckle arm 21 at front and rear positions thereof. The rear wheel suspension also includes a radius arm 25 swingably supported on the rear portion of the frame 1 by a third pivot member 25' near the front portion of the frame 1 and extending obliquely rearwardly from the third pivot member 25', the radius arm 25 being pivotally coupled to a front portion of the knuckle arm 21, and a hydraulic damper 24 connected between the upper portion of the knuckle arm 21 and an upper portion of the frame 1. The upper arm 22 is of a V-shaped member bifurcated from its base pivotally coupled to the upper portion of the knuckle arm 21 and including a front arm 22a and a rear arm 22b pivotally coupled to the rear portion of the frame 1 at front and rear positions, respectively, thereon.

As shown in FIG. 3, although the main pipes 2 extend substantially longitudinally of the vehicle over its entire length, they are curved so as to project transversely outwardly in the vicinity of the driver's seat 12. The main pipes 2 include front rods 2' progressively diverging in a rearward direction toward the transversely outwardly projecting portions of the main pipes 2. The seat side pipes 3 have front ends extending below the front rods 2' of the main pipes 2.

A framework 100 is disposed on each lateral side of the front portion of the frame 1. The framework 100 comprises a plurality of pipes positioned below the front rod 2' of the main pipe 2 and on the front end of the seat side pipe 3.

The framework 100 includes a substantially V-shaped front lower pipe 4 comprising a front inclined rod 4b extending substantially parallel to the longitudinal central line or axis C of the frame 1 as viewed in plan in FIG. 3 and inclined upwardly in the forward direction as shown in side elevation in FIG. 2, and a rising rod 4a contiguous to the front inclined rod 4b and inclined upwardly in the rearward direction, the rising rod 4a progressively diverging laterally outwardly and being joined to the front end of the seat side pipe 3. The rising rod 4a reaches and is coupled to the proximal portion of the front rod 2' of the main pipe 2. The framework 100 also includes an upper pipe 5 extending from an intermediate portion of the rising rod 4a and inclined upwardly in the forward direction, the upper pipe 5 being joined to the front end portion of the front rod 2' of the main pipe 2.

Since the rising rod 4a which is inclined upwardly in the rearward direction diverges laterally outwardly and is joined to the proximal portion of the front rod 2' of the main pipe 2, the upper pipe 5 with its rear end coupled to the rising rod 4a also progressively diverges laterally outwardly from its front end toward the rear end joined to the rising rod 4a, as shown in FIG. 3.

In the front portion of the frame 1, the front ends of the laterally spaced front rods 2' are interconnected by an upper end pipe 6, whereas the front ends of the front inclined rods 4b of the front lower pipes 4 are interconnected by a lower end pipe 7. The laterally opposite ends of the upper and lower end pipes 6, 7 are joined by stiffener pipes 8. The front end of each of the front rods 2' of the main pipes 2 projects forwardly beyond the front end of each of the front inclined rods 4b of the front lower pipes 4, as shown in FIG. 2. Therefore, the stiffener pipes 8 are inclined upwardly in the forward direction. The upper pipes 5 are interconnected near their rear ends by a reinforcing cross pipe 9'. The laterally spaced frame members are interconnected by a plurality of cross pipes 9 as shown in FIG. 3.

As illustrated in FIG. 3, the main pipes 2 progressively diverge laterally outwardly so as to be wider toward the driver's seat 12 than the seat side pipes 3, while the frameworks 100 on the front portion of the frame 1 have their front inclined rods 4b parallel to the longitudinal central line C and their rising rods 4a along with the upper pipes 5 diverging laterally outwardly in the upward direction and joined to the proximal portions of the front rods 2' of the main pipes 2.

The double-wishbone front wheel suspensions are pivotally mounted on the respective frameworks 100 on the front portion of the vehicle frame 1.

Each of the front wheel suspensions essentially comprises a knuckle arm 31 on which the front wheel 14 is rotatably supported, a pair of V-shaped upper and lower arms 32, 33 having their bases pivotally coupled to upper and lower portions of the knuckle arm 31, and a hydraulic damper 35 having a lower end pivotally connected to the base of the lower arm 33. The hydraulic damper 35 extends substantially upwardly and has its upper end pivotally joined to a suitable portion of the frame 1. A tie rod 34 projecting between the upper pipe 5 and the front inclined rod 4b has a distal end pivotally coupled to a rear portion of the knuckle arm 31.

The V-shaped upper and lower arms 32, 33 are bifurcated from their bases pivotally mounted on the knuckle arm 31 and include front arms 32a, 33a, respectively, and rear arms 32b, 33b, respectively, which are pivotally connected to the frame 1 at front and rear positions thereon. The front and rear arms 32a, 32b of the upper arm 32 have respective front and rear ends pivotally joined to the upper pipe 5 of the framework 100, and similarly the front and rear arms 33a, 33b of the lower arm 33 have respective front and rear ends pivotally joined to the front inclined rod 4b of the framework 100.

The front and rear arms 32a, 32b of the upper arm 32 and the front and rear arms 33a, 33b of the lower arm 33 are pivotally mounted on the framework 100 as follows:

Two front and rear channel-shaped brackets 36a, 36b depend from a lower surface of the upper pipe 5, and the ends of the front and rear arms 32a, 32b of the upper arm 32 are pivotally coupled respectively to the brackets 36a, 36b by means of pivot shafts or the like. Likewise, two front and rear channel-shaped brackets 37a, 37b project outwardly from an outer side surface of the front inclined rod 4b of the front lower pipe 4, and the ends of the front and rear arms 33a, 33b of the lower arm 33 are pivotally coupled respectively to the brackets 37a, 37b by means of pivot shafts or the like.

Figure 4:
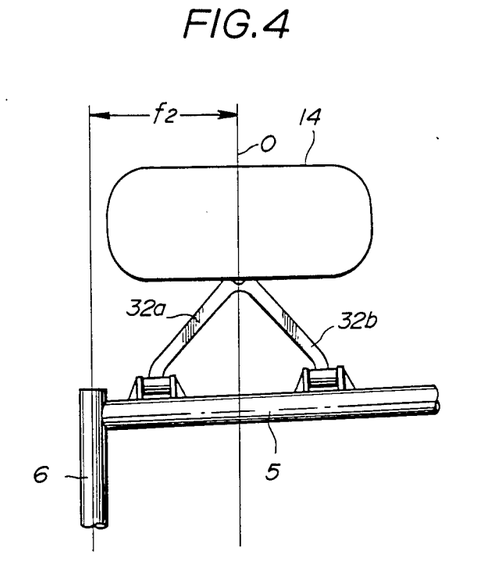
FIG. 4 is a plan view of a front wheel supported by a suspension in the vehicle shown in FIG. 1.

Since the front inclined rod 4b and the upper pipe 5 are inclined upwardly in the forward direction, the distance f2 (FIG. 4) from the center O of the axle of the front wheel 14 to the front end of the frame 1, i.e., the amount of forward projection of the front end of the frame 1, is reduced, and so is the possibility for the front end of the frame 1 contacting the ground while the vehicle is running over rough terrain.

As shown in FIG. 2, the distances A, D from the vertical line N passing through the center O of the axle of the front wheel 14 to the front pivoted ends of the front arms 32a, 32b (or their front central pivot points) of the upper and lower arms 32, 33 are selected to be smaller than the distances B, E, respectively, from the vertical line N to the rear pivoted ends of the rear arms 32b, 33b (or their rear central pivot points) of the upper and lower arms 32, 33, i.e., A<B and D<E. In the illustrated embodiment, the above distances are also selected such that D<A and E<B.

By thus selecting the distances A, D from the vertical line N to the front pivoted points of the arms 32, 33 to be comparatively small, or stated otherwise, by positioning the front pivoted points closer than the rear pivots points to the vertical line N, front half portions of the arms 32, 33 are less liable to get into physical contact with bumps on road surfaces.

Moreover, by thus selecting the distances B, E from the vertical line N to the rear pivoted points of the arms 32, 33 to be comparatively large, or stated otherwise, by positioning the rear pivoted points remotely from the vertical line N, the longitudinal lengths of rear half portions of the arms 32, 33 are increased for greater rigidity against bending forces applied rearwardly thereto.

Figure 8:
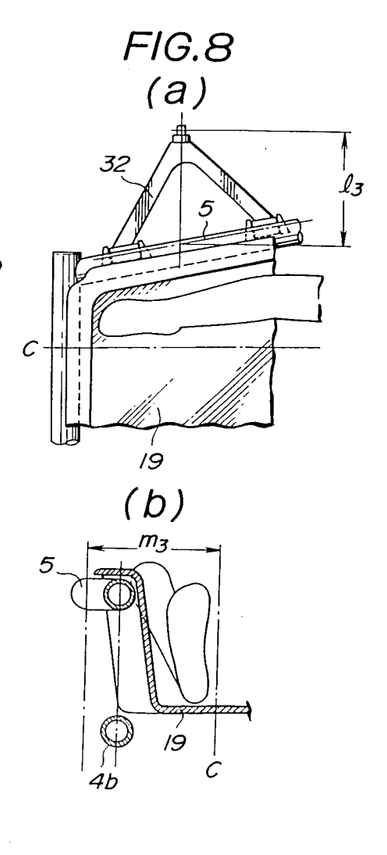
FIGS. 8(a) and 8(b) are fragmentary plan and cross-sectional views of a leg accommodating space in a front frame portion of the off-road vehicle illustrated in FIG. 1.

The upper pipes 5 progressively diverge away from the central line C in the rearward direction. Therefore, a leg space can be increased as indicated by $m_3$ in FIG. 8(b), while at the same time the length $l_3$ (FIG. 8(a)), which is required for swinging movements of the V-shaped upper arm 32 pivotally connected to the upper pipe 5 is also increased. Denoted at 19 in FIGS. 8(a) and (b) is a floor panel. The dimensions shown in FIGS. 6(a) and 6(b), 7(a) and 7(b), and 8(a) and 8(b) are selected as follows:

$$l_3 = l_1 > l_2$$

$$m_3 = m_2 > m_1$$

In the above embodiment, the channel-shaped brackets 36a, 36b depend downwardly from the lower surface of the upper pipe 5, and the channel-shaped brackets 37a, 37b project outwardly from the outer side surface of the front inclined rod 4b of the front lower pipe 4, with the V-shaped arms 32, 33 pivotally mounted on the brackets 36a, 36b and 37a, 37b by means of pivot shafts or the like. The present invention is however not limited to the aforesaid mounting arrangement, but may employ other bracket mounting arrangements, including the following.

Figure 9:
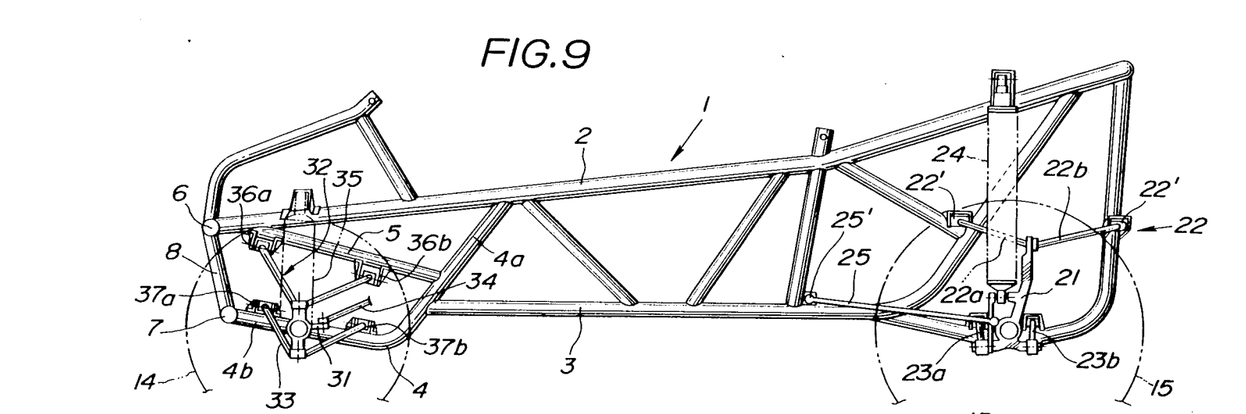
FIG. 9 is a side elevational view of a vehicle frame and suspensions of a modification of the off-road vehicle shown in FIG. 1.
Figure 10:
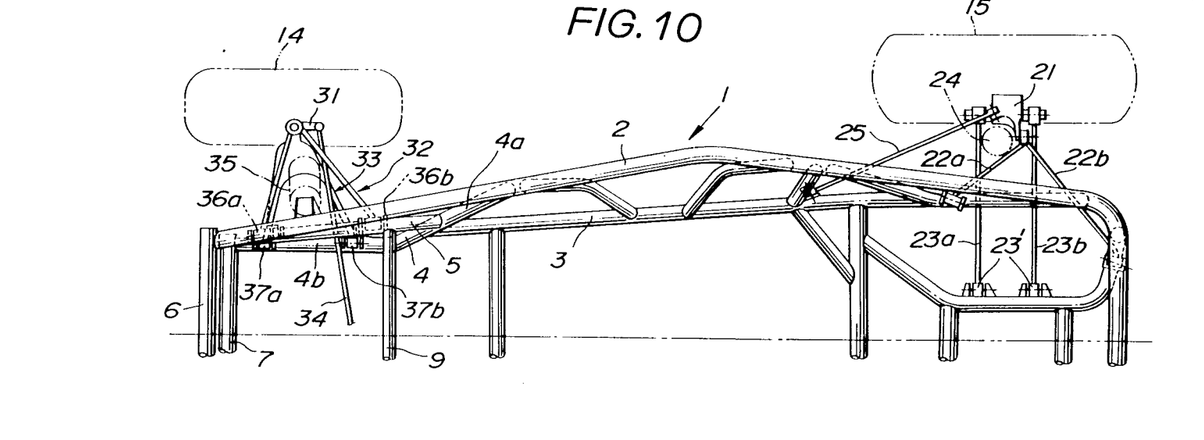
FIG. 10 is a fragmentary plan view of the vehicle frame and suspensions of the off-road vehicle shown in FIG. 9.
Figure 11:
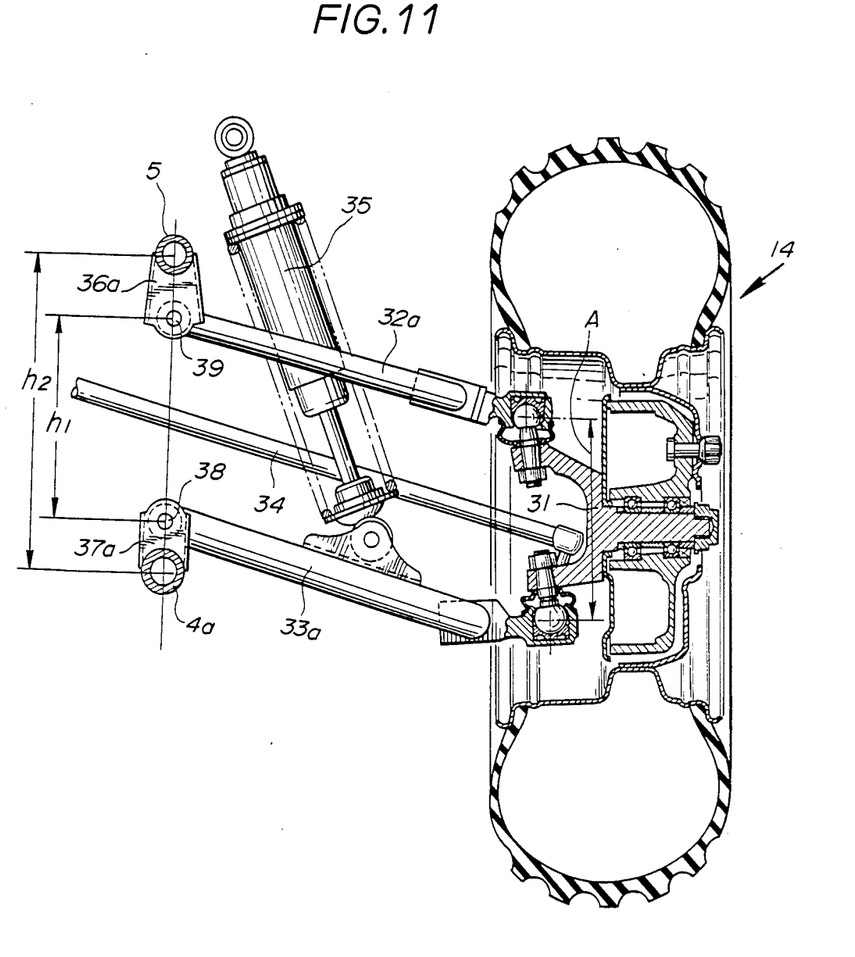
FIG. 11 is a front elevational view a front suspension supporting a front wheel, shown in cross section, in the off-road vehicle illustrated in FIG. 9.

As shown in FIGS. 9 and 10, two channel-shaped brackets 36a, 36b depend downwardly from a lower surface of the upper pipe 5, and two channel-shaped brackets 37a, 37b are erected upwardly from an upper surface of the front inclined rod 4b of the front lower pipe 4. The V-shaped arms 32, 33 are pivotally mounted on these brackets 36a, 36b and 37a, 37b by means of pivot shafts or the like.

Where smaller-diameter tires (smaller-diameter rims) are used on the off-road vehicle of the invention, the vertical dimension A (FIG. 11) between the upper and lower portions of the knuckle arm 31 to which the bases of the V-shaped arms 32, 33 are pivotally coupled is of a relatively small value. The vertical dimension between the upper pipe 5 and the front inclined rod 4b by which the V-shaped arms 32, 33 are pivotally supported is also of a limited value. The vertical dimension between the upper pipe 5 and the front inclined rod 4b can however be increased by this bracket mounting arrangement. More specifically, as shown in FIG. 11, the distance $h_1$ between the pivot shafts 39, 38 to which the pivoted ends of the upper and lower arms 32a, 33a are coupled is equalized to the vertical dimension A of the knuckle arm 31. By adjusting the sizes of the brackets 36a, 37a themselves, therefore, the distance $h_2$ between the frame members 5, 4b to which the brackets 36a, 37a are attached can be increased. Accordingly, the space in which the tie rod 34 is swingable can be increased, and hence the tie rod 34 is prevented from interfering with the upper pipe 5 and the front inclined rod 4b even if the vertical stroke of the front wheel 14 is increased.

The channel-shaped brackets employed in the above embodiments will be described with reference to FIG. 12.

Figure 12:
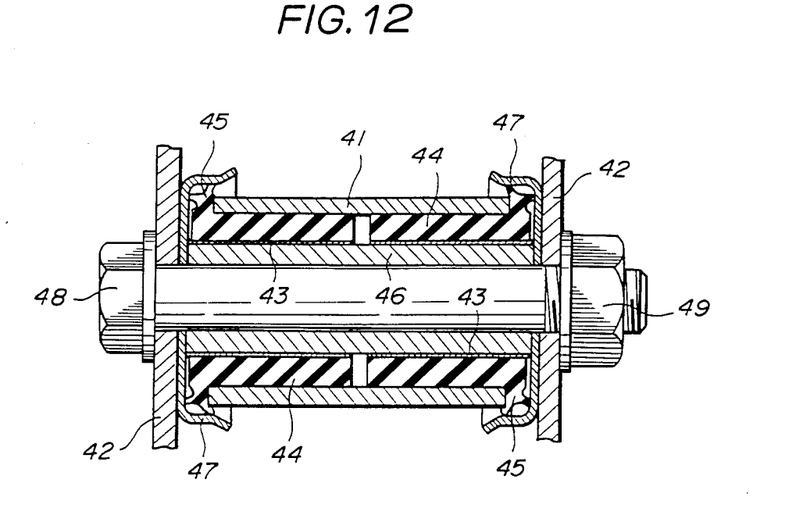
FIG. 12 is an enlarged cross-sectional view of a bracket employed in the off-road vehicles according to the embodiments of the invention.

Denoted in FIG. 12 at 41 is a cylindrical pivoted end of a V-shaped arm, and 42 are front and rear members of a channel-shaped bracket. Two rubber bushings 44 with slidable sleeves 43 of urethane or Teflon attached by curing to the inner peripheral surfaces of the rubber bushings 44 are fitted in the cylindrical pivoted end 41 of the V-shaped arm. A collar 46 is inserted in the slidable sleeves 43. The rubber bushings 44 have dust seals 45 on their outer ends which are covered with respective caps 47. With the rubber bushings 44 placed between the front and rear members 42 of the channel-shaped bracket, a bolt 48 is inserted through the collar 46, and a nut 49 is threaded over the bolt 48. Since the rubber bushings 44 have the slidable sleeves 43 and the dust seals 45 as integral members, the rubber bushings 44 can prevent the cylindrical pivoted end 41 from being inclined with respect to the axis of the bracket, allow the cylindrical pivoted end 41 to slide axially, and seal the cylindrical pivoted end 41 against entry of dust.

With the present invention, because the front inclined rod 4b of the front lower pipe 4 and the front upper pipe 5 are inclined upwardly in the forward direction, the amount of forward projection of the front end of the frame 1 is reduced to lower the weight of the frame 1 and reduce the danger of contact of the front end of the frame 1 with the ground. Since the distances from the vertical line N passing through the center O of the axle of the front wheel 14 to the front pivoted points of the upper and lower arms 32, 33 are smaller than the distances from the vertical line N to the rear pivoted points of the upper and lower arms 32, 33, the possibility for the upper and lower arms 32, 33 to contact with bumps on road surfaces is reduced, and the arms 32, 33 have greater rigidity against bending forces applied rearwardly thereto.

As described above, the upper pipes 5 are progressively spaced from the longitudinal central line C of the vehicle in the forward direction. The leg space for the driver seated on the driver's seat 12 is thus widened, and the substantial swingable length of the upper arm 32 is increased. As a result, the vertical stroke of the front wheel 14 can be increased even with the limited tread of the front wheels 14.

Moreover, the distance between the upper and lower frame members 5, 4b on which the brackets 36a, 36b and 37a, 37b are mounted is greater than the distance between the pivot shafts 39, 38 attached to these brackets and supporting the pivoted ends of the upper and lower arms 32, 33. Consequently, the tie rod 34 extending between the upper and lower frame members 5, 4b is prevented from interfering with these frame member 5, 4b even if the vertical stroke of the front wheel 14 is large.

Although there have been described what are at present considered to be the preferred embodiments of the present invention, it will be understood that the invention may be embodied in other specific forms without departing from the spirit or essential characteristics thereof. The present embodiments are therefore to be considered in all aspects as illustrative, and not restrictive. The scope of the invention is indicated by the appended claims rather than by the foregoing description.

We claim:

1. An off-road vehicle comprising:

a vehicle frame including a pair of laterally spaced main pipes extending substantially longitudinally of the vehicle over the entire length thereof, and a pair of laterally spaced seat side pipes extending substantially parallel to each other below the main pipes, respectively, each of said main pipes and seat side pipes including a front rod progressively diverging outwardly in a rearward direction;

a pair of front wheels rotatably supported on a front portion of said vehicle frame;

a pair of rear wheels rotatably supported on a rear portion of said vehicle frame;

a framework disposed on each lateral side of said vehicle frame and including upper and lower pipes inclined upwardly in a forward direction and substantially parallel to each other, said lower pipe having a front inclined rod inclined upwardly in the forward direction and a rising rod contiguous to the front inclined rod, the rising rod progressively diverging outwardly and inclined upwardly in a rearward direction, said upper pipe progressively diverging outwardly in the rearward direction and having a rear end joined to the rising rod;

a front wheel suspension mechanism comprising a knuckle arm supporting each of the front wheels, a V-shaped upper arm having a base pivotally mounted on an upper portion of said knuckle arm and front and rear ends pivotally attached to said upper pipe at front and rear positions thereon, and a V-shaped lower arm having a base pivotally mounted on a lower portion of said knuckle arm and front and rear ends pivotally attached to said lower pipe at front and rear positions thereon;

a tie rod for turning said front wheels in response to turning movement of a steering handle; and the suspension mechanism being such that when said off-road vehicle is viewed in side elevation, the distances from a vertical line passing through a center of the axle of the front wheel to the pivotal front ends of said V-shaped upper and lower arms are smaller than the distances from the vertical line to the pivotal rear ends of the V-shaped upper and lower arms.

2. An off-road vehicle according to claim 1, wherein said upper pipe includes a front end joined to a front portion of said front rod, said rising rod includes an upper end joined to a rear portion of said front rod, and said seat side pipe is joined to said rising rod; and said vehicle frame further includes an upper end pipe interconnecting the front ends of the front rods of said main pipe, a lower end pipe interconnecting the front ends of the front inclined rods of the lower pipes, stiffener pipes interconnecting opposite ends of said upper and lower pipes, and a reinforcing cross pipe interconnecting the upper pipes near their rear ends.

3. An off-road vehicle according to claim 2, wherein said front and rear pivoted ends of the V-shaped upper arm are coupled by respective pivot shafts to first front and rear channel-shaped brackets, respectively, mounted on said upper pipe at said front and rear positions, and said front and rear pivoted ends of the V-shaped lower arm are coupled by respective pivot shafts to second front and rear channel-shaped brackets, respectively, mounted on said front inclined rod of the lower pipe at said front and rear positions.

4. An off-road vehicle according to claim 3, wherein each of said first front and rear channel-shaped brackets depends from a lower surface of said upper pipe, and each of said second front and rear channel-shaped brackets is erected from an upper surface of said front inclined rod, said tie rod extending from inside of the vehicle between said upper pipe and said front inclined rod and being coupled to the knuckle arm.

* * * * *

UNITED STATES PATENT AND TRADEMARK OFFICE
CERTIFICATE OF CORRECTION

PATENT NO. : 4,799,708

DATED : January 24, 1989

INVENTOR(S) : Akio HANDA et al.

It is certified that error appears in the above-identified patent and that said Letters Patent is hereby corrected as shown below:

```
Column 1, line 20, after "frame" insert a period;
          line 51, change "included" to --inclined--.
Column 3, line 41, change "extend" to --extends--.
Column 4, line 13, after "view" insert --of--;
          line 60, delete "first" (one occurrence).
Column 6, line 68, change "pivots" to --pivot--.
Column 8, line 54, change "member" to --members--.
```

Signed and Sealed this

Twenty-fifth Day of July, 1989

*Attest:*

DONALD J. QUIGG

*Attesting Officer*   *Commissioner of Patents and Trademarks*